May 29, 1945.  A. ROSENTHAL  2,377,042
DECORATIVE ARTICLE AND METHOD OF MAKING SAME
Filed Sept. 9, 1944  2 Sheets-Sheet 1
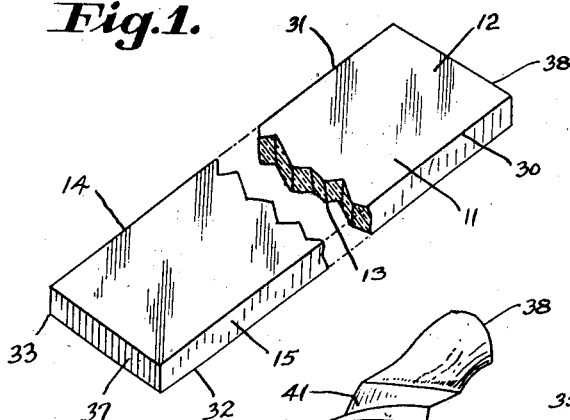
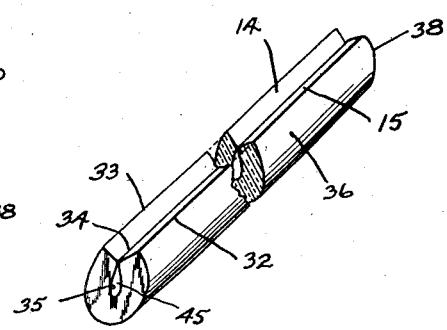
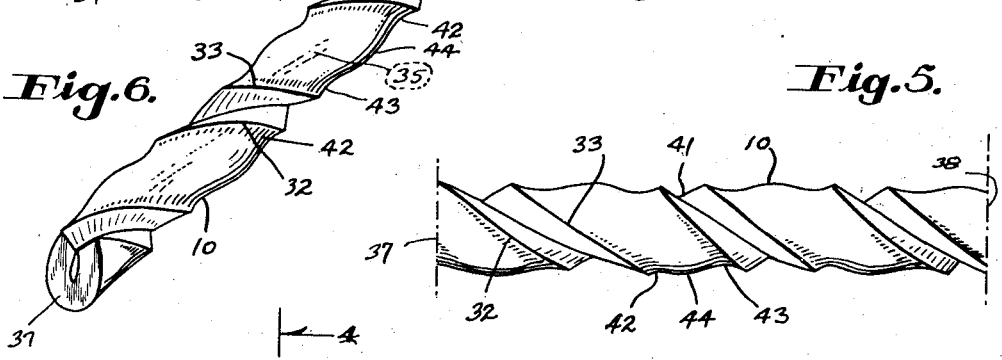
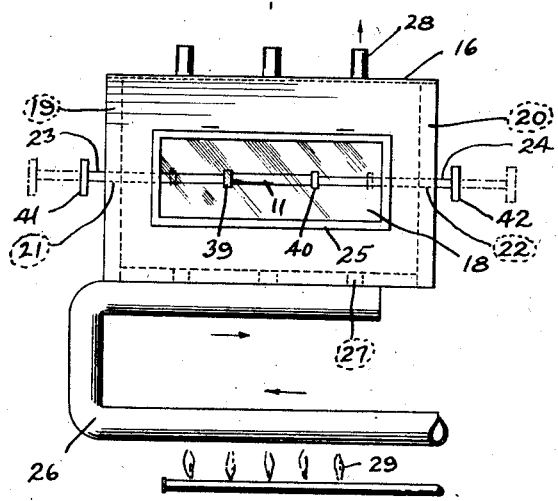
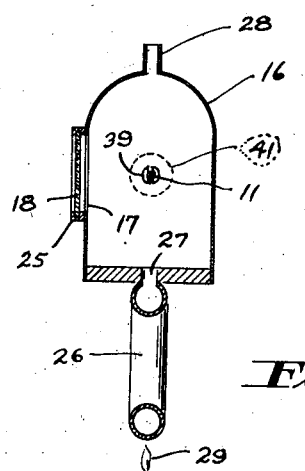
ALLAN ROSENTHAL
INVENTOR
BY Richard S. Temko
ATTORNEY May 29, 1945.  A. ROSENTHAL  2,377,042
DECORATIVE ARTICLE AND METHOD OF MAKING SAME
Filed Sept. 9, 1944  2 Sheets-Sheet 2
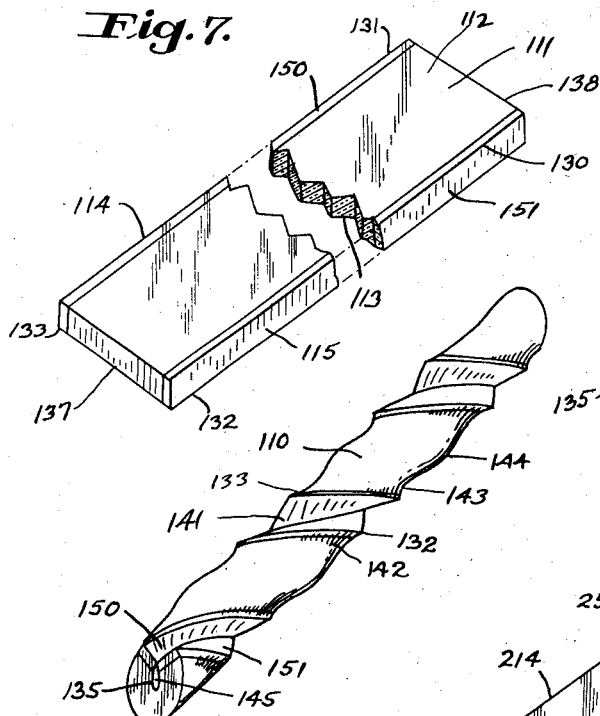
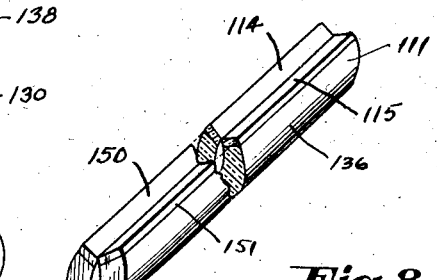
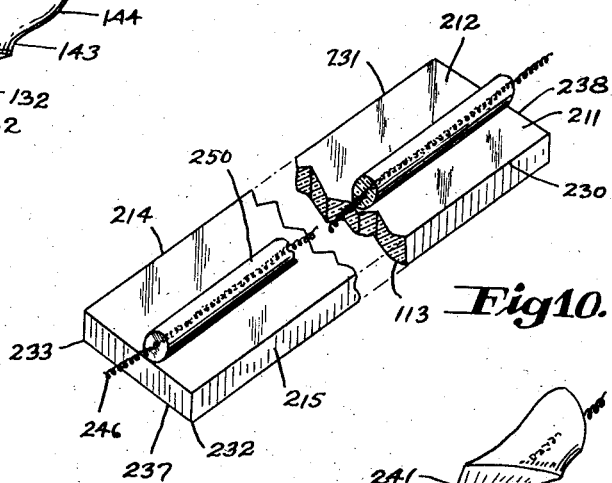
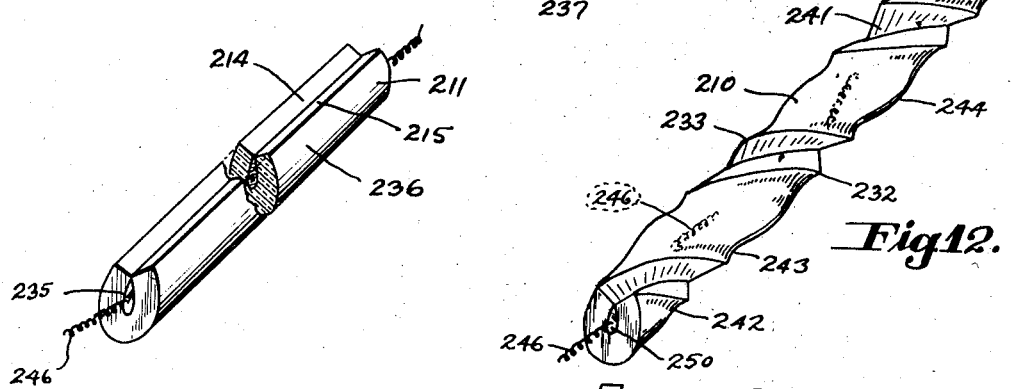
ALLAN ROSENTHAL
INVENTOR
BY Richard S. Temko
ATTORNEY Patented May 29, 1945

2,377,042

UNITED STATES PATENT OFFICE 2,377,042

DECORATIVE ARTICLE AND METHOD OF MAKING SAME

Allan Rosenthal, Brooklyn, N. Y.

Application September 9, 1944, Serial No. 553,325

15 Claims. (Cl. 41—10)

This invention relates generally to decorative materials and more particularly to a novel and useful decorative article composed of thermoplastic material and methods for making the same.

In the decorative arts there has been a great increase in the use of thermoplastic materials which are formed under heat into various decorated useful articles. Such articles have had a wide use and sale, particularly when the material of which they were composed was of a transparent nature so that the light reflecting and refracting characteristics thereof were taken advantage of.

Rod-like or tubular forms have presented problems in the large scale, low cost production thereof because of the large amount of hand-tooling and hand-polishing required. This difficulty is particularly apparent in faceted structures where the individual facets or reflecting surfaces required individual polishing or burnishing to produce the desired light reflecting or refracting characteristics. Another disadvantage flowing from the use of pre-formed rods or tubing and then decorating the same by additional surface incising or abrading treatment, lies in the considerable amount of machining necessary to produce the rod or tube forms or the considerable expense of the provision of a plurality of differently sized extrusion dies. Furthermore, if the material so formed is to be readily adapted for meeting various problems of decoration or the fabrication of a multiplicity of articles, considerable inventories of the various tube or rod diameters must be maintained in stock.

Such disadvantages have been overcome in the present invention by the fact that the effective external diameter of the finished product may be quickly and easily varied by adjustments in the width and thickness in the blank from which the decorative articles are formed.

It is, therefore, among the principal objects of the present invention to provide novel and useful decorative objects and material and a method for producing the same which produces a superior article from a decorative standpoint and one which is more durable and which may be produced in relatively large quantities at low cost.

Another object of the present invention lies in the production of articles of the class described which may be easily varied during the fabrication thereto produce a variety of decorative results both in color and texture.

Another object herein lies in the provision of a decorative article adapted to carry an electrical conductor therein and in which the aesthetically undesirable visibility of said conductor is substantially reduced and may in fact, be turned into an enhancement of the product.

These objects and other incidental ends and advantages will more fully appear in the progress of this disclosure and be pointed out in the appended claims.

In the drawings, similar reference characters designate corresponding parts throughout the several views of each embodiment.

Figure 1 is a fragmentary view in perspective of a blank strip of material in the first stage of its fabrication in accordance with the present invention.

Figure 2 is a fragmentary view in perspective showing the blank strip of Figure 1 during the second step of the herein disclosed method.

Figure 3 is a front elevational view showing the blank strip on a reduced scale during a third stage in the present method of manufacture with associated apparatus therefor.

Figure 4 is a vertical sectional view of Figure 3 as seen from the plane 4—4 thereon.

Figure 5 is a fragmentary elevational view of a decorative article, a product of the herein described method.

Figure 6 is a fragmentary view in perspective of the decorative article shown in Figure 5.

Figure 7 is a fragmentary view in perspective of a blank strip of material in the first stage of its fabrication in accordance with a second embodiment of the invention.

Figure 8 is a fragmentary view in perspective showing the blank strip of Figure 7 during the second step of the method of the second embodiment of the invention.

Figure 9 is a fragmentary view in perspective of the decorative article, a product of the method in the second embodiment of the invention.

Figure 10 is a fragmentary view in perspective of a blank strip of material as well as the secondary strip and conductor in a third embodiment of the invention.

Figure 11 is a perspective view, fragmented, showing the step following Figure 10.

Figure 12 is a fragmentary perspective view of the third embodiment of the invention.

Turning now to the first embodiment of the invention illustrated in Figures 1 to 6 inclusive, the decorative article generally indicated by reference character 10 is preferably formed from a single blank or strip 11 composed of thermoplastic material. For the purpose of avoiding unnecessary repetition in connection with this disclosure, the specification may mention the thermoplastic material, methyl-methacrylate, sold under trade-marks such as "Lucite" or "Plexiglass," but it will be understood by those schooled in the art to which the present invention relates, that other thermoplastic materials may be used. Furthermore, such thermoplastic materials may be transparent, translucent or opaque and they may be homogeneous or may consist of incomplete mixtures of a plurality of different kinds of thermoplastic materials. As will more fully appear in the progress of this disclosure, the ornamental effect of the decorative article 10 is enhanced when the blank 11 is composed of a transparent or translucent material since the light reflecting and refracting properties of the thermoplastic material under such circumstances, is taken advantage of.

Turning to Figure 1, the blank 11 may be of any suitable size, depending upon the dimensions which it is desired that the finished product 10 shall have. The blank 11 may either be a prefabricated strip of the size and shape shown or the same may be cut from a larger piece of the raw material. Where, for example, the base material of which the blank 10 is composed, is a cast synthetic resin, the blank or strip 11 may be severed from a larger cast slab.

As contrasted with prior art methods of handworking, irregular plastic shapes in which the configuration of the article is altered by machining and polishing when in an almost unfinished state, in the present method the blank 11 is given whatever surface decoration it is desired to give it, while the blank is in a flat and regular shape. Thus, the top surface 12, the bottom surface 13, and side edge surfaces 14 and 15 may at this time receive any desired decorative treatment. Such treatment, for example, would include buffing to a high polish; frosting produced by using abrasives of varying degrees of fineness; fuming by the use of volatile materials adapted to affect the surface of the particular material of which the blank 11 is composed; full or partial lacquering or coating, producing predetermined surface irregularities by suitable rolling or stationary dies with heat and pressure, and the like. In the fabrication of the article 10, it is desirable, however, that such surface treatments as have been imparted to the blank 11, be not of such high degree as to destroy the general configuration thereof so as to lose the general helical, fluted effect in the article 10.

Next, the blank 11 is subjected to the action of heat. This may be done in a suitable oven. Such an oven is shown in Figure 3 in which the oven body 16 may be composed of suitable insulating material and may be provided with a viewing opening 17, the latter in turn being closed by a transparent plate. The oven 16 may have suitable end walls 19 and 20, provided with orifices 21 and 22 which act as bearings for the axle rods 23 and 24. The body 16 may be provided with a door 25 for the insertion or removal of the material being treated. Heat to the oven may be supplied by air passing upwardly through the conduit 26 and upwardly through the openings 27, over the blank 11 and out through the flues 28. The air within the conduit 26 may be heated in any suitable manner, as for example by the gas flames 29.

After the blank 11 has been subjected to the action of the heated air just described, a length of time sufficient to cause it to reach a temperature of fusion, the blank 11 is folded transversely about an imaginary longitudinal line bisecting the top surface 12. This fold is preferably not a complete fold so that the corner edges 30 and 31 touch each other along the line 34 (see Figure 2) while the corner edges 32 and 33 are relatively widely spaced. This incomplete folding spaces the opposed folded portions of the top surface 12 so that it then forms the curved inner wall 35. Similarly, the bottom surface 13 forms the curved outer wall 36.

With the blank 12 in the stage shown in Figure 2, the action of the heat thereon is continued so that it may remain in a plastic state and the ends 37 and 38 are grasped within suitable chucks therefor, said chucks being indicated by reference characters 39 and 40 (see Figure 3). The chucks 39 and 40 are secured to the rods 23 and 24, respectively, and said rods at the extremities thereof, are provided with the rotating means 41 and 42. The rotating means 41 and 42, in the case of manual operation of the process, may be ordinary handwheels. Where desired, however, the wheels may be power driven in any suitable manner.

With the soft blank 11 in the form shown in Figure 2 indicated by the chucks 39 and 40, the chucks 39 and 40 are rotated in opposite directions about an axis penetrating the rods 23 and 24 and at the same time, the chucks 39 and 40 are moved outwardly away from each other. Obviously, assuming that the heat, and therefore the plasticity of the mass between the chucks 39 and 40 may be maintained uniformly, a corresponding effect will be obtained by the rotation of only one of the chucks 39 or 40 and the movement of only one of said chucks away from the other.

As a result of the tortion and stretching steps just described, the side edges 14 and 15 take on a helical spatial arrangement, so that the mass after the twisting and pulling, appears as shown in Figures 5 and 6. Obviously, the relative average diameter of the article 10 will be affected by the degree of stretching to which the plastic mass is subjected and the greater the pull, the finer it becomes drawn. The degree of pulling or elongation of the mass in its plastic state will also affect the pitch of the primary flute generally indicated by reference character 41, which is formed by the side edges 14 and 15 as now distorted. The number of complete rotations of one of the ends 37 or 38 with respect to the other, will also affect pitch and configuration of the flute 41.

By virtue of the action of the material under the processed steps described, the corner edges 32 and 33 stand up sharply and secondary furrows 42 and 43 are formed outwardly thereof. The furrows 42 and 43 border a helical bulge 44.

When the decorative article 10 has assumed the desired shape, the heat is removed, for example by stopping the flow of air over the plastic mass and the mass is permitted to congeal. After sufficient cooling, the rod like decorative article 10 is complete and may be cut in predetermined lengths to suit subsequent manufacturing steps in which the article is used. It is important to note at this point, that after the plastic mass has hardened, no additional polishing or buffing is required. This is so because only sufficient heat has been utilized during the forming step to permit the stretching and twisting operation. Not enough heat has been used to create a substantial change in the relatively exposed surfaces of the article 10. It may be further noted at this point, that since the curved inner wall 35 is more or less cylindrical in general configuration, the opposed walls thereof do not contact each other. Thus, the curved inner wall 35 forms an elongated channel or chamber indicated generally by reference character 45 which may be filled with a material having a different refractive index than that of which the blank 11 is composed. Such materials include water, air, or another plastic material. Such volume of material which is of a different refractive index than the blank 11, causes additional bending of light rays, adding to the brilliance and attractiveness of the finished article 10.

Turning now to the second embodiment of the invention illustrated in Figures 7 and 9 inclusive, for the purpose of avoiding unnecessary repetition, parts corresponding to those of the first embodiment are given the same reference characters with the addition of the prefix "1."

The second embodiment differs from the first embodiment principally in the addition of the secondary blank elements 150 and 151. These may be of a different material or have a different color from the main body blank 111. Thus, when these secondary blank elements are stretched and twisted along with the body blank 111, the opposed angular surfaces 114 and 115 of the primary flute 141 will present different appearances with an interesting decorative effect. The step of placing the secondary blank elements along the outer longitudinal edges of the blank 111, is performed prior to the transverse folding along a longitudinal line on the upper surface of the blank 111. From this point forward the other steps described in detail in connection with the first embodiment, are followed.

Turning now to the third embodiment of the invention illustrated in Figures 10 to 12 inclusive, here again for the purpose of avoiding needless repetition, parts corresponding to those of the first embodiment are given the same reference characters with the addition of the prefix "2."

The third embodiment of the invention differs from the first embodiment principally in the filling of the chamber or channel 45 of the first embodiment, with an electrical conductor, preferably disposed within a transparent or translucent tube of thermoplastic material 50. Since most of the thermoplastic materials suitable for use in connection with the present invention have a relatively high dielectric capacity, the disposition of an electrical conductor within the decorative article 210 permits the same to be used as a support for illuminating devices and other devices must be conducted. By virtue of the refracting and reflecting effect of the twisted and stretched plastic material forming the blank 211, the image as viewed by the user of the plastic material 245, is considerably distorted and broken up so that it does not normally present a continuous rectilinear image but rather a series of broken and twisted colored areas. Thus, decorative articles such as the decorative article 210, may form the hanger portions or bases of lamps and the functional aspects of the electrical conductors transmitting energy to the light giving portions of the lamp are reduced to a minimum. While in the drawing only a single conductor is shown as disposed within the plastic 245, obviously a plural number of conductors in spaced relationship may be used. This may be accomplished by the incorporation of a plurality of conductors in individual plastic tubes or wrappings in juxtaposed relation. In the fabrication of the third embodiment of the invention the central plastic portion or the conductor may be inserted into the channel or chamber 45 of the decorative article 10 or the conductor 246 may be of an elastic nature and may be installed prior to the folding operation which in turn precedes the stretching and twisting. Such resiliency of the conductor 246 may be obtained in any suitable manner as for example by helically coiling the conductor. It may thus be seen that I have disclosed a novel and useful decorative article and methods of making the same wherein such articles may be produced in large quantities at relatively low cost. The finished article presents a highly desirable appearance and has many utilitarian aspects outlined hereinabove.

I wish it to be understood that I do not desire to be limited to the exact details of construction shown and described, for obvious modifications will occur to a person skilled in the art.

I claim:

1. As a new article of manufacture, a decorative article comprising: an elongated tube of transparent material having a helically fluted exterior and having a hollow internal channel of substantially elliptical cross-section.

2. A decorative article comprising: an elongated tube of light transmitting material having a hollow internal channel of substantially elliptical cross-section, one end of said ellipse forming an acute angle, and having a helical flute extending along the outer surface of said tube.

3. As a new article of manufacture, a decorative article comprising: an elongated tube of light transmitting material having a hollow internal channel of substantially elliptical cross-section; a helical flute extending along the outer surface of said tube; and secondary furrows helically extending along said tube in spaced and parallel relation to said flute.

4. As a new article of manufacture, a decorative article comprising: an elongated tube of light transmitting material having a hollow internal channel of substantially elliptical cross-section; a helical flute extending along the outer surface of said tube; secondary furrows helically extending along said tube in spaced and parallel relation to said flute; and a helical bulge disposed substantially midway between adjacent convolutions of said flute.

5. As a new article of manufacture, a decorative article comprising: an elongated tube of light transmitting thermoplastic material having a hollow internal channel of substantially elliptical cross-section and a helical flute extending along the outer surface of said tube, said flute being formed by the angular juxtaposed side edges of an elongated block shaped blank folded longitudinally upon itself and twisted about its longitudinal axis.

6. As a new article of manufacture, a decorative article comprising: an elongated tube of transparent thermoplastic material having a hollow internal channel of substantially elliptical cross-section; a helical flute extending along the outer surface of said tube, said flute being formed by the angularly juxtaposed side edges of an elongated block shaped blank; secondary furrows helically extending along said tube in spaced and parallel relation to said flute; and a helical bulge disposed substantially midway between adjacent convolutions of said flute.

7. A decorative article comprising: an elongated block shaped blank of plastic material, said blank being incompletely folded about a longitudinally arranged line on the upper surface of said blank, sufficiently to bring the upper longitudinal corner edges into contact; said blank being twisted about the longitudinal axis of said article and stretched therealong.

8. A decorative article comprising: an elongated block shaped blank of plastic material in the form of a tube; said blank being incompletely folded about a longitudinally arranged line on the upper surface of said blank, sufficiently to bring the upper longitudinal corner edges into contact; said blank being twisted about the longitudinal axis of said article whereby the longitudinal side edges of said blank form a helical flute, the exposed surfaces of said flute being composed of material having different light transmitting properties than the material of which the tube is composed.

9. As a new article of manufacture, a decorative article comprising: an elongated tube of light transmitting material having a hollow internal channel and a helical flute extending along the outer surface of said tube; and a core portion of material differing in light handling properties from the material of which the tube is composed, said core portion being disposed within said channel.

10. As a new article of manufacture, a decorative article comprising: an elongated tube of transparent thermoplastic material having a hollow internal channel of substantially elliptical cross-section; a helical flute extending along the outer surface of said tube, said flute being formed by the angularly juxtaposed side edges of an elongated block shaped blank; secondary furrows helically extending along said tube in spaced and parallel relation to said flute; a helical bulge disposed substantially midway between adjacent convolutions of said flute; and an electrical conductor disposed within said channel; whereby light reflected from said conductor through said tube, is refracted so as to create a discontinuous visual appearance of said conductor when viewed laterally through said tube.

11. The method of manufacturing a decorative article including the steps of: taking an elongated block shaped blank of plastic material, said blank having ends, a top surface, a bottom surface, a pair of side edges, and opposed pairs of upper and lower corner edges; softening said blank; and folding said blank transversely about a longitudinal line on the upper surface of the blank, while the blank is in a plastic state, until the upper corner edges are in contact, to form a tube.

12. The method of manufacturing a decorative article including the steps of: taking an elongated block shaped blank of plastic material, said blank having ends, at top surface, a bottom surface, a pair of side edges, and opposed pairs of upper and lower corner edges; softening said blank; folding said blank transversely about a longitudinal line on the upper surface of the blank, while the blank is in a plastic state, until the upper corner edges are in contact, to form a tube; and twisting said tube about its longitudinal axis.

13. The method of manufacturing a decorative article including the steps of: taking an elongated block shaped blank of plastic material, said blank having ends, a top surface, a bottom surface, a pair of side edges, and opposed pairs of upper and lower corner edges; softening said blank; folding said blank transversely about a longitudinal line on the upper surface of the blank, while the blank is in a plastic state, until the upper corner edges are in contact, to form a tube; and stretching said tube about its longitudinal axis.

14. The method of manufacturing a decorative article including the steps of: taking an elongated block shaped blank of plastic material, said blank having ends, a top surface, a bottom surface, a pair of side edges, and opposed pairs of upper and lower corner edges; softening said blank; folding said blank transversely about a longitudinal line on the upper surface of the blank, while the blank is in a plastic state, until the upper corner edges are in contact, to form a tube; and simultaneously twisting and stretching said tube respectively about and along its longitudinal axis.

15. The method of manufacturing a decorative article including the steps of: taking an elongated block shaped blank of material which may be softened, said blank having ends, a top surface, a bottom surface, a pair of side edges and opposed pairs of upper and lower corner edges; placing an independent strip of material, which may be softened, on the upper surface of the blank; softening said blank and independent strip; folding said blank transversely about said independent strip until the upper corner edges of said blank are in contact to form a tube enclosing said independent strip and simultaneously twisting; and stretching said tube respectively about and along its longitudinal axis.

ALLAN ROSENTHAL.